United States Patent
Daniel et al.

(10) Patent No.: US 8,077,029 B1
(45) Date of Patent: Dec. 13, 2011

(54) PORTABLE ALARM VIDEO RECORDING AND TRANSMITTING DEVICE

(75) Inventors: Isaac S. Daniel, Miami, FL (US);
Hortencia Daniel, Miami, FL (US);
Antonio Alfonso, Bronx, NY (US)

(73) Assignee: F3M3 Companies, Inc., Miramar, FL (US)

( * ) Notice: Subject to any disclaimer, the term of this patent is extended or adjusted under 35 U.S.C. 154(b) by 415 days.

(21) Appl. No.: 12/456,738

(22) Filed: Jun. 22, 2009

(51) Int. Cl.
*G08B 1/08* (2006.01)
*H04N 7/18* (2006.01)

(52) U.S. Cl. ............... 340/539.11; 340/531; 340/573.1; 340/539.13; 340/539.25; 348/135; 348/143; 348/151

(58) Field of Classification Search .............. 340/539.11
See application file for complete search history.

(56) References Cited

U.S. PATENT DOCUMENTS

| | | | | |
|---|---|---|---|---|
| 5,726,660 A | * | 3/1998 | Purdy et al. ............. | 342/357.75 |
| 5,886,739 A | * | 3/1999 | Winningstad ............. | 348/158 |
| 7,483,485 B2 | * | 1/2009 | Winningstad et al. ... | 375/240.01 |
| 2008/0030580 A1 | * | 2/2008 | Kashiwa et al. ............. | 348/158 |

* cited by examiner

*Primary Examiner* — Donnie Crosland
(74) *Attorney, Agent, or Firm* — Carol N. Green, Esq.

(57) ABSTRACT

A portable alarm video recording and transmitting device includes first and second component units in wireless communications with each other, the first component unit includes illuminating apparatus for providing lighting and is in communication with audiovisual recording apparatus for capturing and recording pictorial images and audio generating recorded video images that are converted to an electronic signal that is transmitted to the second component unit's communicating apparatus. The second component unit includes an alarm circuit that includes communicating, location determining, and alarm notification apparatus, wherein the communicating apparatus receives the electronic signal from the first component unit's communicating apparatus and is in electrical communication with the location determining apparatus for determining the location of the second component unit and by extension the wearer, with apparatus for encoding the location in the alarm signal transmitted by the second component unit's communicating apparatus along with recorded video images to a monitoring station remote from where the wearer's location, wherein recorded video images may be monitored in real-time. Incoming alarm notification from the remote monitoring station may be received alerting the wearer of impending danger.

23 Claims, 4 Drawing Sheets

PORTABLE ALARM VIDEO RECORDING AND TRANSMITTING DEVICE

FIELD OF THE INVENTION

The present invention relates generally to a portable alarm video recording and transmitting device comprising of a first and second component unit in wireless communications with each other, wherein the first component unit includes illuminating means for providing lighting, where the illuminating means is in electrical communication with audiovisual recording means for capturing and recording pictorial images and audio generating recorded video images that are converted to an electronic signal that is transmitted to the second component unit's communicating means. The second component unit includes an alarm circuit, wherein the alarm circuit further includes communicating means, location determining means and alarm notification means, wherein the communicating means receives the electronic signal from the first component unit's communicating means and is in electrical communication with the location determining means for determining the location of the second component unit and by extension the wearer, with means for encoding said location in an alarm signal which is transmitted by the second component unit's communicating means along with the recorded video images to a monitoring station at a remote location where the wearer's location and recorded video images may be monitored in real-time. The communicating means is also capable of receiving an incoming alarm notification from the remote monitoring station alerting the wearer of the second component unit of impending danger.

BACKGROUND OF THE INVENTION

Generally, police officers, firefighters, emergency personnel and/or other emergency rescuers (collectively "first responders") are dispatched to a scene based on sketchy information gleamed during a civilian's call for help. Upon arrival at the scene, the first responder confirms his/her arrival with the dispatcher at the local precinct and proceeds to assess the situation to resolve the immediate issues. This process may involve interviewing eyewitnesses, the injured party(ies), eye witness(es) and/or requesting additional assistance or auxiliary services, e.g. ambulance units, bomb squad, etc.

The problem is that not until the first responder actually arrives at the scene can he/she make a true assessment of the hidden dangers to him/herself, the alleged victim(s) and/or other third parties. It is also well known in law enforcement that "stable" situations can rapidly deteriorate placing the first responder's personal safety in imminent danger. As such, first responders rely heavily on their partners for coverage from additional threats or dangers that are outside his/her line of vision and/or hearing. On occasion, both partners require additional backup to neutralize the threat(s) where an additional pair of eyes and ears would be extremely helpful in identifying hidden dangers lurking beyond the first responders' line of vision and/or hearing, e.g. from behind.

Although police cars or firefighter's trucks are equipped with two-way radios, a first responder is not always close enough to their vehicles to radio dispatch for backup and/or additional assistance. As a result several officers', firefighters' and/or other first responders' lives are lost in the line of duty. Thus, there exists a need for dispatch to be able to monitor their first responders to ensure that adequate assistance and security coverage are available and/or to supply backup as needed, regardless of whether the first responder is capable of requesting the same. It would also be helpful for dispatch to be able to monitor and view the scene live from the first responder's perspective as they patrol the scene.

Crime scenes are generally fraught with tension as arrestees are unpredictable and often claim false statements and/or use of excessive force by the arresting officer, placing the arresting officer's reputation in an unfavorable light. Police departments have universally attempted to mitigate false allegations by equipping police cars with audiovisual recording equipment used for traffic stops and some arrests. The recorded images and audio assist in deciphering the truth of the allegations concerning the arrest scene, but invariably the scope of the visual recorded images is limited to events occurring directly in front of the police car, where the audiovisual equipment is generally mounted. Events occurring outside that limited scope will not be captured. Thus, it would be helpful for an arresting officer's activities to be captured live and monitored in real-time in an easy, unobtrusive manner providing a permanent record of the events.

This invention satisfies these long felt needs and solves the foregoing problems that the prior art has been unable to solve in a new and novel manner.

SUMMARY OF THE INVENTION

The present invention relates generally to a portable alarm video recording and transmitting device comprising of a first component unit and a second component unit in wireless communications with each other, each enclosed within a casing with fastening means attached to the casing's exterior surface for detachably securing the casings to a wearer's clothes. The first component unit comprises of audiovisual recording circuit for capturing and recording pictorial images and audio, the audiovisual recording circuit positioned within said first component unit. The circuit includes a circuit board with illuminating means, audiovisual recording means, communicating means, antennae, battery and wiring positioned thereon. The illuminating means, for providing lighting upon selective activation of the illuminating means, is electrically connected to audiovisual recording means for capturing and recording pictorial images and audio generating recorded video images upon selective activation of the first component unit by activating an activation button on said second component unit. The activation button of the second component unit is also capable of being activated wirelessly by a monitoring station at a remote location. Upon activation, the audiovisual recording means captures and records pictorial images and audio converting the recorded video images into an electronic signal containing the recorded video images that is transmitted wirelessly by the first component unit's communicating means to the second component unit's communicating means. The audiovisual recording means includes a miniature camera system equipped with a microphone, and is electrically connected to the illuminating means. The first component unit and by extension the audiovisual recording means and the illuminating means are also capable of wireless activation by the monitoring station at a remote location.

The first component unit also includes an illuminating switch for selective activation of the illuminating means, the illuminating switch is positioned on an exterior surface of the first component unit and is electrically connected to the audiovisual recording circuit. The light intensity of the illuminating means may be adjusted from high to low intensity to display any one or more of the following: white, green, blue or red light for tactical purposes.

The communicating means of both the first and second component units may use any one or more of the following wireless transmissions: radio transmissions, microwave transmissions, broadband wireless data transmissions and/or satellite transmission, using any one or more of the following wireless protocol: Blue Tooth, ZigBee, 802.11 series, or any other short range wireless protocol that is well known and used in the arts and other future short range wireless protocol suitable for transmitting data over a short distance. The communicating means may comprise of a radio transceiver, e.g. a ZigBee transceiver, with integrated radio and shared antenna, or direct conversion receivers; digital radio receivers; super heterodyne receivers; or any other receivers or transceivers that are well known and used in the arts. Preferably the communicating means include a combined wireless transceiver, e.g. a ZigBee transceiver with integrated radio and shared antennae. However, other wireless transceivers that are well known and used in the arts may be used to practice the invention.

Both the first and second component units of the portable alarm video recording and transmitting device are small and may be detachably secured either permanently, semi-permanently or temporarily to the wearer's clothes. The first component unit may be detachably secured to the wearer's shoulder lapel, shirt buttons, or any other location on the wearer's body that would provide a good vantage point for recording video images of the wearer's surroundings. Preferably, the wearer may secure the first component unit on his/her shoulder or hat, as those locations provide the greatest visual coverage of the scene for the monitoring station's review. The second component unit may be detachably secured to the wearer's belt, but it is understood that the second component unit may be secured to the wearer's pockets or any other location that is readily accessible to the wearer.

The second component unit is enclosed within a casing of similar material(s) and functionality as the first component unit. The second component unit comprises of an alarm circuit for generating an alarm signal upon selective activation of an activation button positioned on an exterior surface of the second component unit and in electrical communication with the alarm circuit. The alarm circuit positioned within the second component unit and includes a circuit board having communicating means, a speaker, battery, antenna, conventional wiring, location determining means, alarm notification means, and a microprocessor positioned thereon in electrical communication with each other by conventional wiring. The second component unit's communicating means, for receiving the electronic signal containing the recorded video images from the first component unit's communicating means, and wherein the second component unit's communicating means is in electrical communication with location determining means for determining the location of the second component unit with means for encoding the location in the alarm signal, which is transmitted by the second component unit's communicating means that is connected to said alarm circuit. Upon activation of the activation button, the alarm signal is generated by the alarm circuit and the alarm signal includes the encoded location as well as the electronic signal containing the recorded video images that are transmitted by the second component unit's communicating means to a monitoring station at a remote location where the transmitted alarm signal and recorded video images may be monitored in real-time.

The second component unit's communicating means is in electrical communication with a speaker, wherein the communicating means is capable of receiving and transmitting electronic signals containing audio transmissions to and from the monitoring station which are amplified over the speaker. In this manner, the wearer of the portable alarm video recording and transmitting device is able to receive and transmit audio to the monitoring station keeping both the monitoring personnel and the wearer audibly informed.

The location determining means and the means for encoding the location in the alarm signal is comprised of a global positioning system receiver connected to the microprocessor. The global positioning system receiver provides an output signal containing the geographical location of the wearer of the second component unit to the microprocessor and the generated alarm signal is encoded with the geographical location. The communications means transmits the alarm signal containing the geographical location to the monitoring station, which receives the generated alarm signal containing the geographical location thereon and monitoring personnel at the monitoring station are able to visually monitor the geographical location of the wearer based on the receipt of said generated alarm signal containing the geographical location encoded thereon.

The monitoring station may communicate impending danger of which the wearer may not be aware of, by sending a wireless alarm notification to the second component unit's alarm notification means, which is in electrical communication with the second component unit's communicating means, for receiving an encrypted signal containing an alarm notification generated from the monitoring station, wherein the encrypted signal containing an alarm notification is decrypted by the microprocessor in electrical communication with both the second component unit's communicating means and the alarm notification means, for alerting the wearer of receipt of the encrypted signal containing an alarm notification. The alarm notification means may comprise of a vibration motor electrically connected to the circuit board capable of causing a vibration of the second component unit, or may include Dual-tone multi-frequency ("DTMF") decoders also electrically connected to the circuit board and speaker capable of sounding an audio alarm; a single tone alert system sounding an alarm like a Sonalert; or as in one embodiment the invention, the microprocessor is electrically connected to a display element programmed to flash a light thereon on receipt of the alarm signal. In this manner, the alarm notification means may cause a vibration of the second component unit, sound an alarm or flash a display on a display element, thereby alerting the wearer of the received alarm. Upon receipt of the alarm signal, the wearer may proceed to take any precautionary measures to mitigate against any impending threats.

The wearer may also transmit a silent alarm for assistance to the monitoring station by selectively activating an alarm button positioned on an exterior surface of the second component unit, which is in electrical communication with the alarm circuit, where upon activation of the alarm button an alarm signal is generated by the alarm circuit and the signal includes the encoded location of the wearer, which is transmitted by the second component unit's communication means for receipt at the monitoring station providing notification of the wearer's location and the request for assistance.

The portable alarm video recording and transmitting device may be used by emergency responders and/or law enforcement officers, and as such a wearer may include but is not limited to any one or more of the following: a fireman, police officer, sheriff, emergency medical services personnel, emergency rescuers, security officers, investigators, marshals, pilots, military personnel and/or other law enforcement officers and/or agencies.

A primary object of the present invention is to provide a portable alarm video recording and transmitting device that assists law enforcement officers, firefighters, emergency rescuers and/or other emergency personnel for improving their safety in the execution of their duties that overcomes the limitations of the prior art.

A primary object of the present invention is to provide first responders with means for efficient and safer communications with dispatchers at a remote monitoring station using wireless technology to transmit and record live events.

Still yet another object of the present invention is to provide a permanent record of events occurring during emergency responders' execution of their duties.

Another object of the present invention is to provide a portable alarm video recording and transmitting device which allows for a silent alarm to be issued by the wearer of the portable alarm video recording and transmitting device to alert a monitoring station that help is required.

Still yet another object of the present invention is to provide a portable alarm video recording and transmitting device, which wirelessly records and transmits instant audio and video images to designated locations for immediate review.

Another object of the present invention is to provide a controllable light source utilizing wireless activation and controls.

Yet another object of the present invention is to provide a portable alarm video recording and transmitting device which includes a circuit board, battery, microprocessor, activation switch, and wiring.

Another object of the present invention is to provide component units that may be detachably secured to the wearer's clothes.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Further objectives and advantages of the present invention may be derived by referring to the detailed description and claims when considered in connection with the Figures, wherein like reference numbers refer to similar items throughout the Figures.

DETAILED DESCRIPTION OF THE PREFERRED EMBODIMENT

Figure 1:
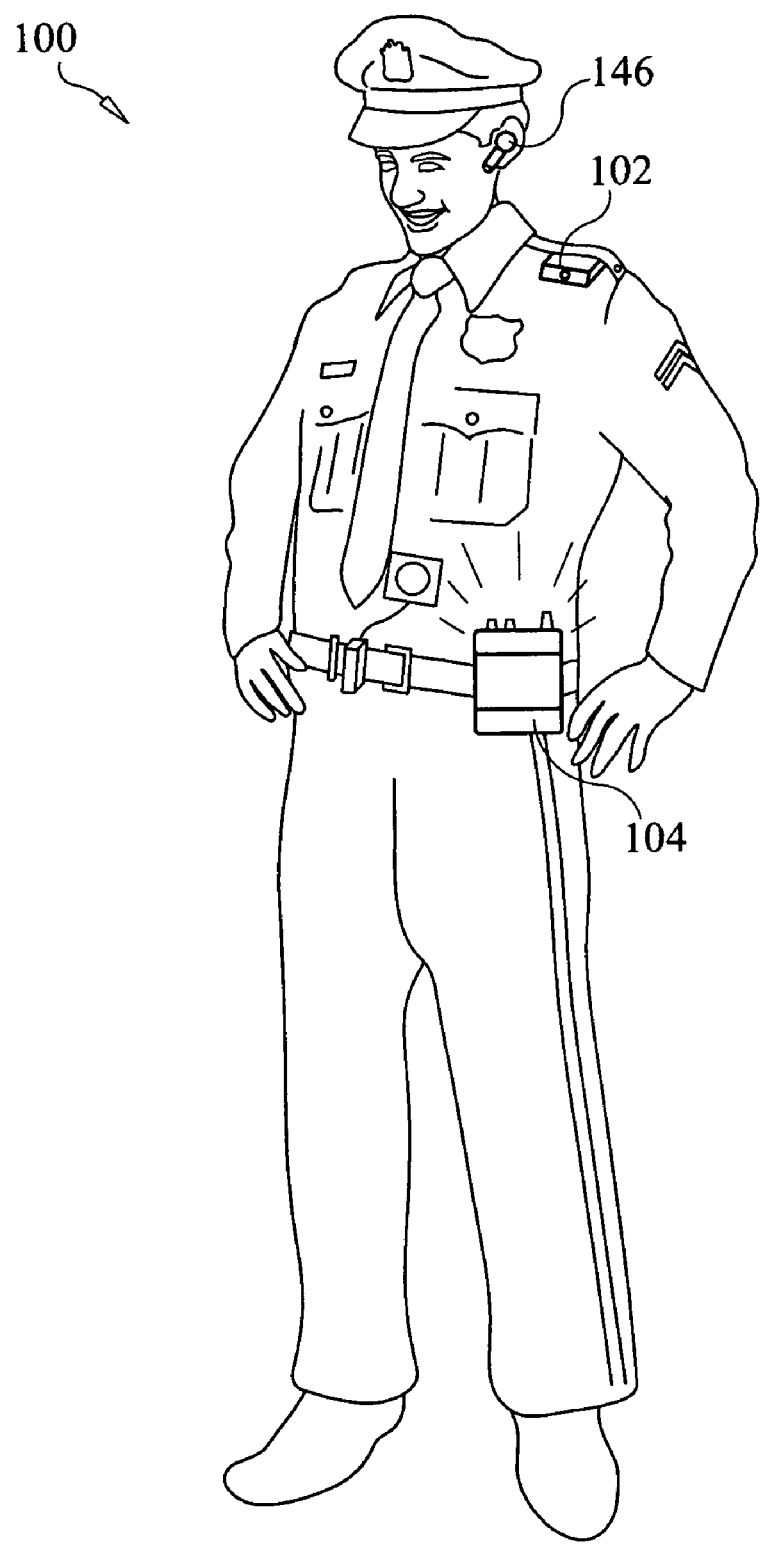
FIG. 1 is an illustrative view of the portable alarm video recording and transmitting device according to an embodiment of the present invention.

The following discussion describes in detail an embodiment of the portable alarm video recording and transmitting device. This discussion should not be construed, however, as limiting the invention to those particular embodiments as practitioners skilled in the art will recognize numerous other embodiments as well. For definition of the complete scope of the invention, the reader is directed to the appended claims.

Turning now descriptively to the drawings, in which similar reference characters denote similar elements throughout the several views.

FIG. 1 is an illustrative view of the portable alarm video recording and transmitting device 100 according to an embodiment of the present invention. The portable alarm video recording and transmitting device 100 comprises of a first component unit 102 and a second component unit 104 in wireless communications with each other that may be used by emergency responders and/or other law enforcement officers. As such, a wearer may include but is not limited to any one or more of the following: a fireman, police officer, sheriff, emergency medical services personnel, emergency rescuers, security officers, investigators, marshals, pilots, military personnel and/or other law enforcement officers and/or agencies.

Figure 2A:
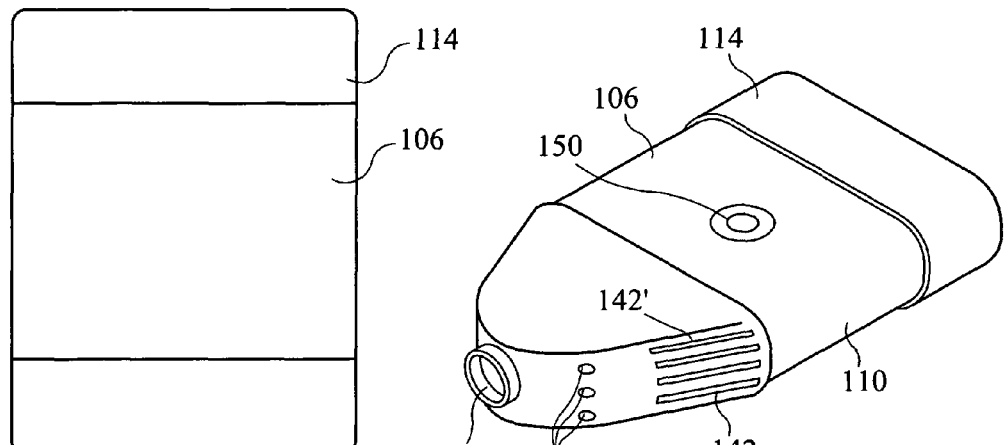
FIG. 2A shows an illustrative view of the first component unit according to an embodiment of the present invention

Both the first and second component units 102, 104, are enclosed within a casing 106, 106' with fastening means 108, 108' (not shown) attached to the casing's exterior surface 110, 110' for detachably securing the casing 106, 106' to the wearer's clothes. The fastening means 108, 108' (not shown) may include any one or more of the following: a clip(s), snaps, fasteners, a plurality of miniature filament hook elements and a plurality of miniature filament loop elements where the plurality of miniature monofilament hook elements cooperates with the plurality of miniature monofilament loop elements for detachable engagement more commonly known as Velcro®, as well as any other fastening means 108, 108' (not shown) that are readily known and used in the arts for detachably securing items. The casings 106, 106' are formed from a semi-rigid material to prevent breakage and/or damage to the electrical elements 112, 112' (not shown), i.e. collectively the circuits, wiring, etc., contained therein. As seen in FIG. 2A, in one embodiment of the invention, the first component unit's casing 106 is partially covered with an optional removable sleeve 114 made from rubber, foam and/or plastic to prevent slippage and to assist in securing the first component unit 102 into position.

The first component unit 102 may be positioned on the wearer's shoulders to provide maximum vantage point for the audiovisual recording means 116 (not shown) and is equipped with a microphone 118, for capturing and recording pictorial images 119 (not shown) and audio 120 (not shown) generating recorded video images 122 (not shown), i.e. pictorial images 119 (not shown) and audio 120 (not shown) collectively, that are transmitted to the monitoring station 124 at a remote location. Placement under the wearer's shoulder lapel keeps the first component unit 102 hidden from view, which may be to the wearer's advantage if a potential assailant is unaware of its existence. Alternatively, the first component unit 102 may be detachably secured either temporarily, semi-permanently or permanently to the wearer's hat, shirt pocket, collar or any other convenient location for recording useful video images 122 (not shown). The second component unit 104 may be detachably secured either temporarily, semi-permanently or permanently to the wearer's clothes. The second component unit 104 may be secured to the wearer's belt as shown in FIG. 1, or the wearer's pants pockets or any other location that is easily accessible to the wearer.

FIG. 2A shows an illustrative view of the first component unit 102 according to an embodiment of the present invention. The audiovisual recording means 116 (not shown) includes a video camera system 126 electrically connected to a microphone 118 for capturing and recording pictorial images 119 (not shown) and audio 120 (not shown) generating recorded video images 122 (not shown). The video camera system 126 may comprise of closed circuit television camera systems, miniature camcorders, digital camera systems, etc. or any other recording camera systems that are well known and used in the arts. Upon selective activation by the wearer and/or remotely by monitoring personnel at the monitoring station 124, the video camera system 126 captures live pictorial images 119 (not shown) and audio 120 (not shown) via the camera lens 128 and microphone 118, respectively. In one embodiment of the invention, there are more than one camera lens 128, 128' which may be strategically placed on opposite ends of the first component unit 102 to capture a 180 degrees viewpoint in the front and rear of the first component unit 102 for a 360 degree view.

The first component unit 102 may include a microprocessor 130 which converts the recorded video images 122 (not shown) into an electronic signal 132 (not shown) containing the recorded video images 122 (not shown). This electronic signal 132 (not shown) containing the recorded video images 122 (not shown) is transmitted wirelessly by the first component's communicating means 134 to the second component unit's communicating means 134', which re-transmits the electronic signal 132 (not shown) containing the recorded video images 122 (not shown) as a live broadcast over a communications network 138 (not shown), preferably a satellite network system, to the monitoring station 124 at a remote location for immediate review. In an alternate embodiment of the invention, the video camera system 126 includes its own microprocessor 130 which converts the recorded video images 122 (not shown) into an electronic signal 132 (not shown).

In one embodiment of the invention, the recorded video images 122 (not shown) are stored on a storage media 138 within the first component unit 102, e.g. a SD card, for later retrieval. In another embodiment of the invention, the recorded video images 122 (not shown) may be transmitted via an auxiliary cable 140 (not shown) connecting the first component unit's communicating means 134 to the second component unit's communicating means 134' for storage on the second component unit's storage media 138'.

As seen in FIG. 2A, the casing 106 includes a plurality of vented ports 142, 142', for the audiovisual recording means' microphone 118, which may comprise of a bidirectional or omni-directional microphone that are commonly known and used in the arts. The audiovisual recording means 116 (not shown) is in electrical communication with the first component unit's communicating means 134 for transmitting the recorded video images 122 (not shown) to the second component communicating means 134'. Both the first and second component units' communicating means 134, 134' may use any one or more of the following wireless transmissions: radio transmissions, microwave transmissions, broadband wireless data transmissions and/or satellite transmission, using any one or more of the following wireless protocol: Blue Tooth, ZigBee, 802.11 series, or any other short range wireless protocol that is well known and used in the arts and other future short range wireless protocol suitable for transmitting data over a short distance. The communicating means 134, 134' may comprise of a two way radio transceiver, e.g. a ZigBee transceiver, with integrated radio and shared antenna 144, or direct conversion receivers; digital radio receivers; super heterodyne receivers; or any other receivers or transceivers that are well known and used in the arts. Preferably the communicating means 134, 134' include a combined wireless transceiver, e.g. a ZigBee transceiver with integrated radio and shared antenna 144. However, other wireless transceivers that are well known and used in the arts may be used to practice the invention.

In one embodiment of the invention, the first and/or second component unit's communicating means 134, 134' are in wireless communication with an earpiece 146, as seen in FIG. 1, which includes a microphone 118' and communicating means 134", e.g. a two-way radio transceiver, for transmitting and receiving audio to and from the monitoring station 124 using Bluetooth technology to wirelessly transmit and receive audio over a cellular network. In this manner, monitoring station 120 (not shown) may communicate perceived danger and/or other information directly with the wearer via the earpiece 146, e.g. information concerning additional assistance.

The first component unit 102 also includes illuminating means 148 for providing lighting, which is electrically connected to the audiovisual recording means 116 (not shown). The illuminating means 148 is capable of wireless activation by the monitoring station 124. Alternatively, the wearer may selectively activate an illuminating switch 150 being positioned on an exterior surface 110 of the first component unit 102 and electrically connected to the first component unit's audiovisual recording circuit 152, for activating the illuminating means 148. The illuminating means 148 may include an electronic light source, e.g. Light-Emitting Diode (LED) lights, where the light intensity may be adjusted from high to low intensity without compromising the brightness. As such, the illuminating means 148 may be adjusted to display any one or more of the following: white, red, green or blue light, depending on the wearer's needs for tactical purposes.

Figure 2B:
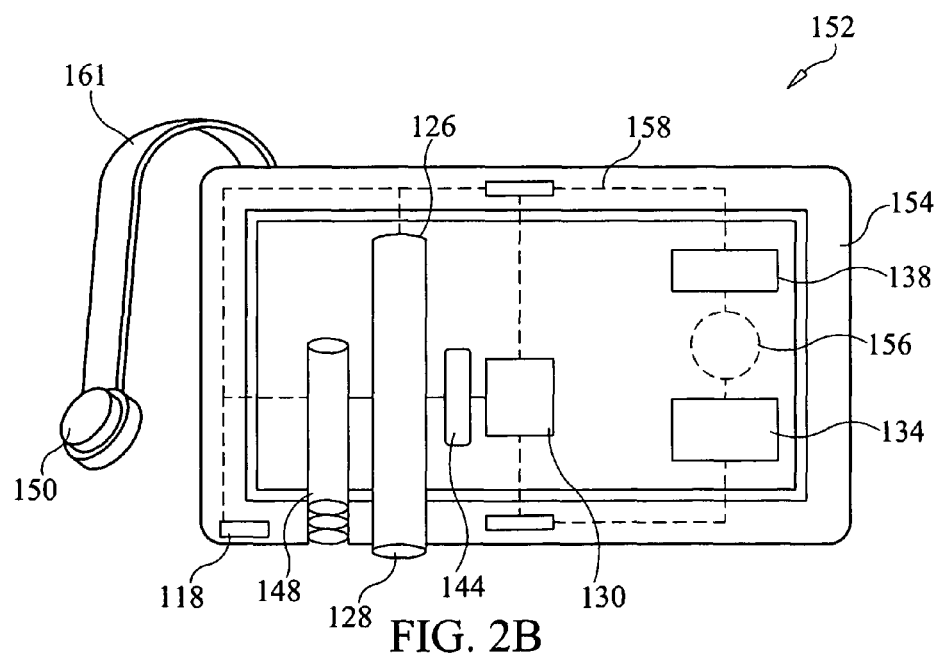
FIG. 2B shows an illustrative view of the circuit of the first component unit according to an embodiment of the present invention.

FIG. 2B shows an illustrative view of the audiovisual recording circuit 152 of the first component unit 102 according to an embodiment of the present invention. As shown in FIG. 2B, the first component unit's audiovisual recording circuit 152 includes a circuit board 154 having the illuminating means 148, audiovisual recording means 116 (not shown), communicating means 134, antennae 140, battery 156 and wires 158 positioned thereon, for capturing, recording and optionally illuminating the pictorial images 119 (not shown) and audio 120 (not shown) generating the recorded video images 122 (not shown) that are being transmitted to the monitoring station 124. The first component unit's electrical elements 112 (not shown), i.e. video camera system 126, microphone 118, communicating means 134, illuminating means 148, antennae 140, battery 156 are all electrically connected on the circuit board 154 by conventional wires 158. Preferably, the circuit board 154 is formed from a polyimide film which is flexible yet can remain stable in a wide range of extreme temperatures, e.g. Kapton®. However, the circuit board 154 may be formed from silicon, fiberglass, Mylar, or other suitable materials that are well known and used in the arts. The circuit board 154 is small enough to be contained within the casing 106.

The first component unit 102 and by extension the audiovisual recording means 116 (not shown) may be wirelessly activated by monitoring personnel at a remote monitoring station 124 or selectively by the wearer activating an activation button 160 on the second component unit 104. Upon activation, the video camera system 126 starts capturing and recording pictorial images 119 (not shown) and audio 120 (not shown) generating recorded video images 122 (not shown), which are converted to an electronic signal 132 (not shown) containing the recorded video images 122 (not shown) that is transmitted wirelessly to the second component unit's communicating means 134' which re-transmits the electronic signal 132 (not shown) containing the recorded video images 122 (not shown) to the monitoring station 124. Occasionally, additional lighting may be required to illuminate the wearer's surroundings. Conventional wires 158 connect the illuminating switch 150 (not shown) with the circuit board 154, which are encased within a wiring harness 161. Accordingly, as needed, the wearer may activate the illuminating switch 150 (not shown) for activating the illuminating means 148 to provide lighting during the capturing and recording of pictorial images 119 (not shown) and audio 120 (not shown).

In an alternate embodiment of the invention, the first component unit's communicating means 134 directly transmits the electronic signal 132 (not shown) containing recorded video images 122 (not shown) to the monitoring station 124 without first routing the electronic signal 132 (not shown) to the second component unit's communicating means 134'. In this manner the first component unit 102 of the portable alarm video recording and transmitting device 100 may act as a standalone device independently transmitting the recorded video images 122 (not shown) to the monitoring station 120 (not shown).

Figure 3A:
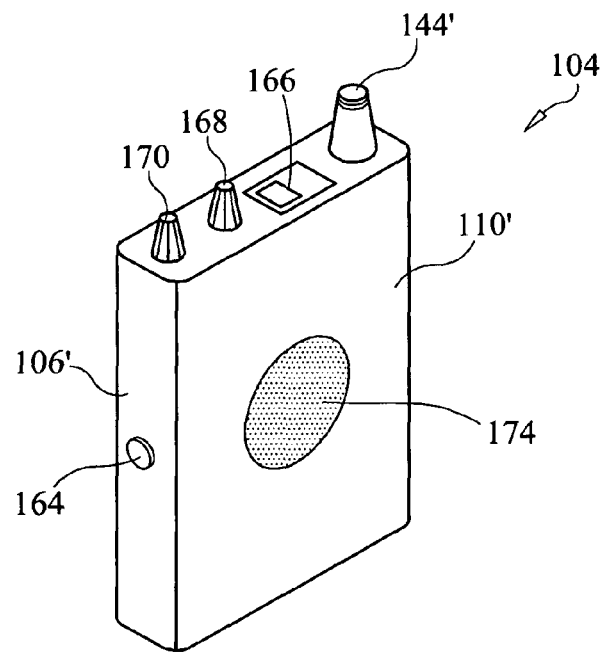
FIG. 3A shows an illustrative view of the second component unit according to an embodiment of the present invention.
Figure 3B:
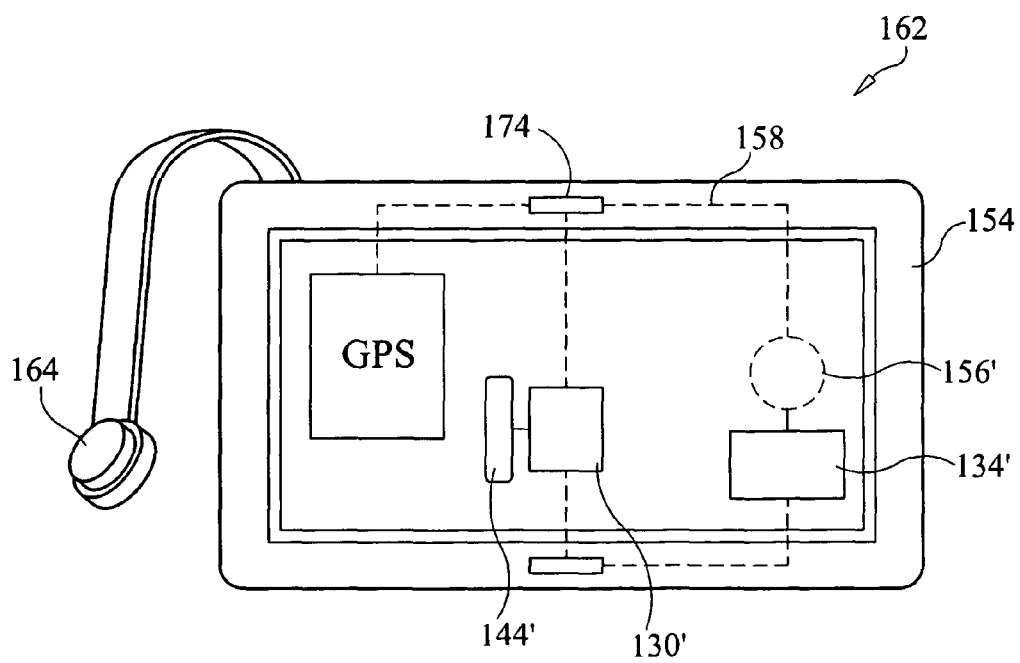
FIG. 3B shows an illustrative view of the circuit of the second component unit according to an embodiment of the present invention.
Figure 4:
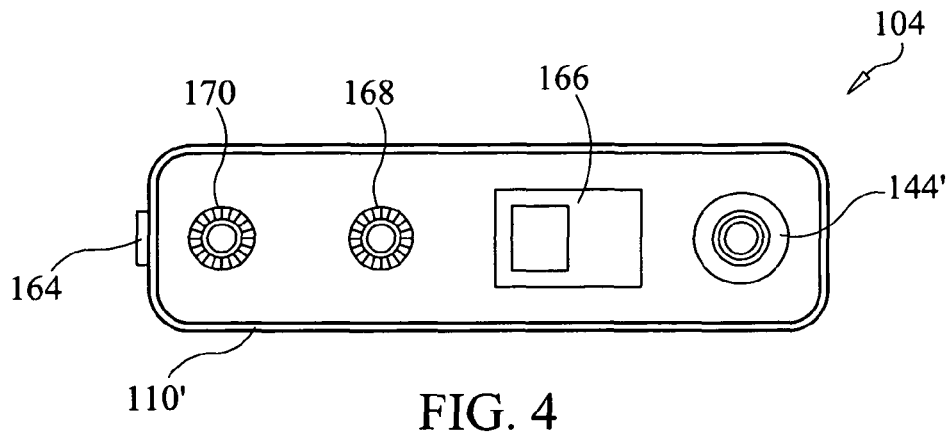
FIG. 4 is an illustrative top plan view of the second component unit of the invention according to an embodiment of the invention.

FIGS. 3A, 3B & 4 show an illustrative view of the second component unit 104 according to an embodiment of the present invention; an illustrative view of the second component unit's alarm circuit 162 according to an embodiment of the present invention and an illustrative top plan view of the second component unit 104 of the invention according to an embodiment of the invention. The second component unit 104 is contained within a casing 106' of similar material(s) and functionality as the first component unit 102.

As seen in FIGS. 3A & 4, positioned on an exterior surface 110' of the second component unit 104 is an alarm button 164, antenna 144', power display 166, channel selector button 168, an activation button 160, menu button 170 (not shown), and a charger connector port 172 (not shown). Conventional wires 158' connect the alarm button 164, antenna 144', power display 166, channel selector button 168, an activation button 160 and a charger connector port 172 (not shown) to the alarm circuit 162. As shown in FIG. 3A, the alarm button 164, antenna 144', power display 166, channel selector button 168, an activation button 160 and a charger connector port 172 (not shown) are all positioned on the top exterior surface 110' of the second component unit 104. However, it is understood that they could easily have been positioned separately or in any combination on any other location on the exterior surface 110' of the second component unit 104.

The activation button 160 may be used to at least one of: activate and/or deactivate the first and second component unit 102, 104 as well as increase and/or decrease the volume for two way radio transmissions to and from the monitoring station's 124 personnel which may be amplified by the speaker 174, which is in electrical communication with the communicating means 134'. The channel selector button 168 allows the wearer to choose the desired bandwidth for transmitting and receiving radio communications to and from the monitoring station 124 as the optimal bandwidth may vary depending on the wearer's physical location, e.g. inside or outside a building, mountainous terrain, urban areas, etc. The power display 166 and the charger connector port 172 (not shown) are in electrical communication with the battery 156', where the battery life of the second component unit 104 and readiness for use may be easily observed at anytime, while the charger connector port 172 (not shown) allows the battery 156' to be recharged during or after use.

FIG. 3B is an illustrative view of the alarm circuit 162' of the second component unit 104 according to an embodiment of the present invention. The alarm circuit 162 is capable of generating an alarm signal 182 (not shown) upon selective activation of the activation button 160, which is positioned on an exterior surface 110' of the second component unit's casing 106'. The alarm circuit 162' includes a circuit board 154' having the communicating means 134', battery 156', antenna 144', wires 158', means for encoding 176 (not shown) the wearer's location, alarm notification means 178 (not shown), speaker 174, location determining means 180 (not shown), and a microprocessor 130' positioned thereon, are all electrically connected to the circuit board 154' by conventional wires 158'. In an alternate embodiment, the antenna 144'is alternatively imbedded within the microprocessor 130. Preferably, the circuit board 154 is formed from a polyimide film which is flexible yet can remain stable in a wide range of extreme temperatures, e.g. Kapton®. However, the circuit board 154' may be formed from silicon, fiberglass, Mylar, or other suitable materials that are well known and used in the arts. The circuit board 154' is small enough to be contained within the casing 108'.

Upon activation of the activation button 160, the microprocessor 130' wirelessly activates both the first and second component units 102, 104 to capture and record pictorial images 119 (not shown) and audio 120 (not shown) and to generates an alarm signal 182 (not shown) by the first and second component units 102, 104, respectively. The microprocessor 130' provides the generated alarm signal 182 (not shown) to the second component unit's communicating means 134' for re-transmission thereof to the monitoring station 124. The communicating means 134' which received the electronic signal 132 (not shown) containing the recorded video images 122 (not shown) from the first component unit's communicating means 134 then transmits the alarm signal 182 (not shown) and the recorded video images 122 (not shown) to the monitoring station 124 via the antenna 144'. The communicating means 134' is also electrically connected to the speaker 174 which amplifies audio transmissions received from and/or being transmitted to the monitoring station 124. In this manner the monitoring station 124 is able to warn and provide real-time instructions to the wearer, and vice versa.

The location determining means 180 (not shown) is used for determining the location of the second component unit 104 and by way of extension the wearer of the second component unit 104. In this manner, the location of the wearer may be readily determined and monitored by the monitoring station 124 at all times. The location determining means 180 (not shown) and the means for encoding 176 (not shown) the location in the alarm signal 182 (not shown) is comprised of a global positioning system receiver 184 (not shown) connected to the microprocessor 130'. The global positioning system receiver 184 (not shown) provides an output signal 186 (not shown) containing the geographical location 188 (not shown) of the wearer of the second component unit 104 to the microprocessor 130' and the generated alarm signal 182 (not shown) is encoded with the geographical location 188 (not shown). The communications means 130' transmits the alarm signal 182 (not shown) containing the encoded geographical location 188 (not shown) to the monitoring station 124, which receives the generated alarm signal 182 (not shown) containing the encoded geographical location 188 (not shown) thereon and is able to visually monitor the geographical location 188 (not shown) of the wearer based on the receipt of the generated alarm signal 182 (not shown) containing the geographical location 188 (not shown) encoded thereon.

The second component unit 104 is powered by the battery 156', which may be recharged via a charger connector port 172, for recharging the battery 156 with an external power supply, e.g. electricity via an electrical cable configured to accommodate the second component unit's charger connector port 172, which is in electrical communication with the battery 156'. In an alternate embodiment, the external power supply may include one or more battery cells 190 (not shown) equipped with an electrical cable 192 (not shown) for directly connecting to the second component unit's battery 156' to allow recharging of the second component unit 104.

The alarm notification means 178 (not shown) of the alarm circuit 162 also alerts the wearer of the second component unit 104 of any incoming encrypted alarm signal 182 (not shown) transmitted by the monitoring station 124 warning the wearer of imminent danger. The alarm notification means 178 (not shown) may comprise of a vibration motor electrically connected to the circuit board 154' capable of causing a vibration of the second component unit 104, or may include Dual-tone multi-frequency ("DTMF") decoders also electrically connected to the circuit board 154' and speaker 174 (not shown) capable of sounding an audio alarm; a single tone alert system sounding an alarm like a Sonalert; or the microprocessor 130' electrically connected to a display element 194 (not shown) programmed to flash a light thereon on receipt of the encrypted alarm signal 182 (not shown). In this manner, the alarm notification means 178 (not shown) may cause for example a vibration of the second component unit 104, sound an audio alarm or flash a light, thereby alerting the wearer of the received encrypted alarm signal 188 (not shown). Upon receipt of the encrypted alarm signal 188 (not shown), the wearer may take precautionary measures to mitigate against any impending threat of danger.

The alarm circuit 162 may be used to generate a silent alarm signal 182 (not shown), where the wearer of the portable alarm video recording and transmitting device 100 may activate an alarm button 164 positioned on an exterior surface 110 of the second component unit 104, which is in electrical communication with the alarm circuit 162, where upon activation of the alarm button 164 an alarm signal 182 (not shown) is generated by the alarm circuit 162 and said alarm signal 182 (not shown) includes said encoded location of the wearer, which is transmitted by said second component unit's communication means 134' for receipt at said monitoring station 124 providing notification of the wearer's location and the request for assistance. The alarm button 164 may be programmed such that multiple activations of the alarm button 164 notifies the monitoring station 124 of an increasing level of alarm and/or distress. In this manner, the monitoring station 124 may prepare an urgent response.

In one embodiment of the invention, the second component unit 104 also includes a driver's license terminal 196 (not shown) with a slot 198 (not shown) for sliding a driver's license within, where the driver's license terminal 196 (not shown) extracts the electronic data stored thereon, for wireless transmission of the driver's license data to the monitoring station 124 for verification and any additional information concerning the owner of the driver's license. In this manner, the wearer of the portable alarm video recording and transmitting device 100 may wirelessly transmit driver's license data quickly and efficiently, which may be reported back as text to be displayed on a display element 194 (not shown) on the portable alarm video recording and transmitting device 100. The driver's license data is wirelessly transmitted using either cellular networks or satellite networks. The display element 194 (not shown) may be programmed to display a report in text, graphic and/or audio. The display element 194 (not shown) may also be used for displaying the perspective views of the first component unit's camera lenses 128, 128' as being transmitted to the monitoring station 124. In this manner, the wearer may use the display element 194 (not shown) to confirm that the desired views are being transmitted and/or provide correction if necessary.

In yet another embodiment of the portable alarm video recording and transmitting device 100, the second component unit includes a scanner 200 on an exterior surface 110 of the second component unit 104, for wirelessly scanning the vehicle identification number of a vehicle to confirm ownership and authorized use.

Figure 5:
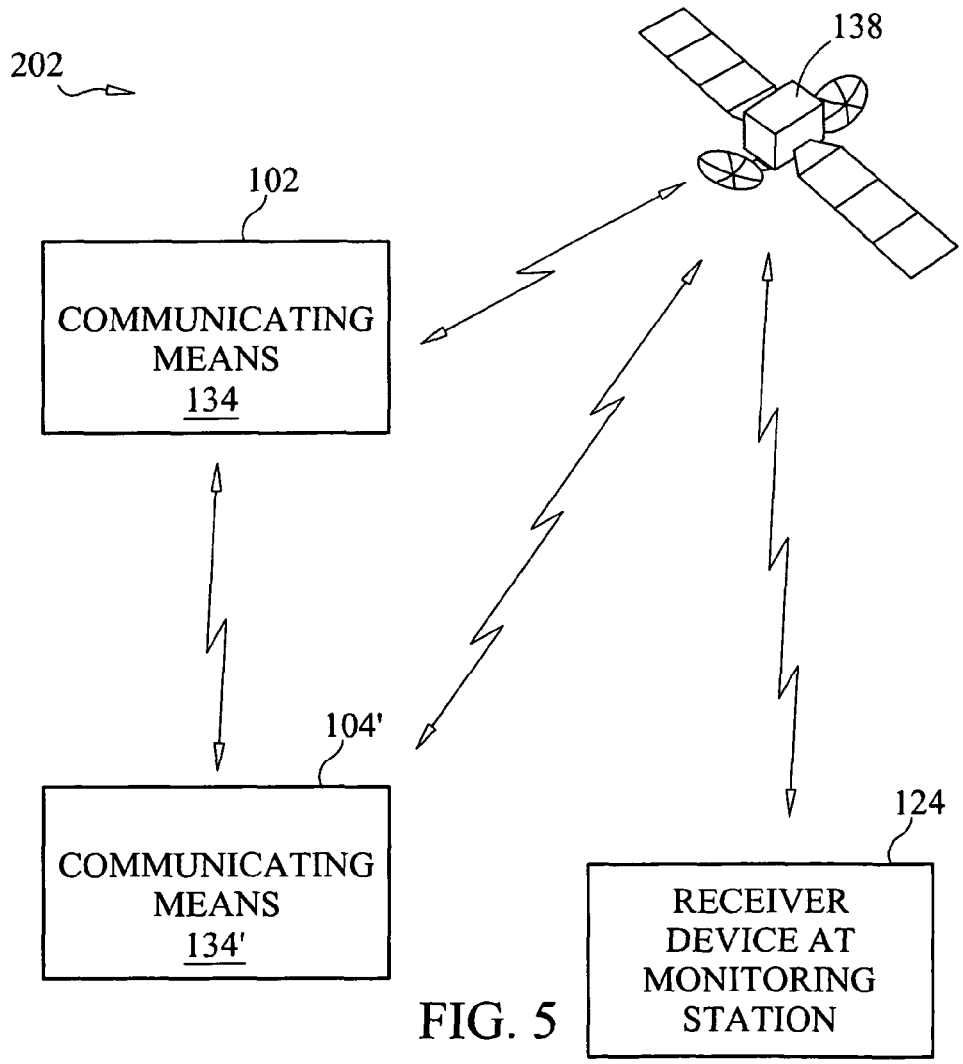
FIG. 5 is an illustrative diagram of the system of the invention according to an embodiment of the invention.

FIG. 5 is an illustrative diagram of the system 202 of the invention according to an embodiment of the invention. The present invention is a portable alarm video recording and transmitting device 100 comprising of a first component unit 102 and a second component unit 104 wherein the first component unit 102 may be used for recording pictorial images 119 (not shown) and audio 120 (not shown) generating recorded video images 122 (not shown) that may be transmitted in real time to a monitoring station 124 for immediate review.

The wearer and/or the monitoring station 124 may selectively activate the first component unit to capture and record pictorial images 119 (not shown) and audio 120 (not shown) generating recorded video images 122 (not shown) for the monitoring station's 124 review, converting the recorded video images 122 (not shown) into an electronic signal 132 (not shown) that is transmitted wirelessly by the first component unit's communicating means 134 to the second component unit's communicating means 134', which retransmits the electronic signal 132 (not shown) to monitoring station 124. In one embodiment of the invention, the first component unit's communicating means 134 directly transmits the electronic signal 132 (not shown) to the monitoring station 124 without routing the electronic signal 132 (not shown) via the second component unit's communicating means 134'.

Upon activation of the second component unit 104, its communicating means 134' receives the electronic signal 132 (not shown) from the first component unit's communicating means 134 and re-transmits the electronic signal 132 (not shown) over a communications network system 138 (not shown) which may be a satellite system or a cellular network system. The second component unit also includes location determining means 180 (not shown) and the means for encoding 176 (not shown) the location in an alarm signal 182 (not shown) which comprises of a global positioning system receiver 184 (not shown) connected to the microprocessor 130'. The global positioning system receiver 184 (not shown) provides an output signal 186 (not shown) containing the geographical location 188 (not shown) of the wearer of the second component unit 104 to the microprocessor 130' and the generated alarm signal 182 (not shown) is encoded with the geographical location 188 (not shown). The second component unit's communications means 130' transmits the alarm signal 182 (not shown) containing the encoded geographical location 188 (not shown) to the monitoring station 124, which receives the generated alarm signal 182 (not shown) containing the encoded geographical location 188 (not shown) thereon and is able to visually monitor the geographical location 188 (not shown) of the wearer and the recorded video images 122 (not shown) based on the receipt of the generated alarm signal 182 (not shown) containing the geographical location 188 (not shown) encoded thereon and the recorded video images 122 (not shown).

In one embodiment of the invention, the second component unit 104 includes a modem 204 for transmitting and receiving data transmissions over a long range over the communications network 138 (not shown), e.g. a satellite network system.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A portable alarm video recording and transmitting device comprising of:
   (a) a first component unit having communicating means for transmitting and a second component unit having communicating means for transmitting in wireless communications with each other, each enclosed within a casing with fastening means attached to the casing's exterior surface for detachably securing the casings to a wearer's clothes;
   (b) audiovisual recording circuit for capturing and recording pictorial images and audio, said audiovisual recording circuit positioned within said first component unit, wherein said audiovisual recording circuit including illuminating means for providing lighting upon selective activation of said illuminating means;
   (c) said audiovisual recording means for capturing and recording pictorial images and audio generating recorded video images upon selective activation of the first component unit by activating an activation button on said second component unit, where upon activation said audiovisual recording means captures and records pictorial images and audio converting the recorded video images into an electronic signal containing said recorded video images that is transmitted wirelessly by said first component unit's communicating means to said second component unit's communicating means;
   (d) an illuminating switch for selective activation of said illuminating means, said illuminating switch being positioned on said exterior surface of said first component unit and electrically connected to said audiovisual recording circuit; and
   (e) an alarm circuit for generating an alarm signal upon selective activation of an activation button positioned on an exterior surface of said second component unit and in electrical communication with the alarm circuit, said alarm circuit positioned within said second component unit and includes communicating means, for receiving said electronic signal containing said recorded video images from the first component unit's communicating means, and wherein said second component unit's communicating means is in electrical communication with location determining means for determining the location of the second component unit with means for encoding said location in said alarm signal which is transmitted by said second component unit's communicating means that is connected to said alarm circuit, wherein upon activation of said activation button, said alarm signal is generated by said alarm circuit and said alarm signal includes said encoded location and said electronic signal containing said recorded video images that are transmitted by said second component unit's communicating means to a monitoring station at a remote location where said transmitted alarm signal and recorded video images may be monitored in real-time.

2. The portable alarm video recording and transmitting device of claim 1, wherein said microprocessor positioned on the alarm circuit and electrically connected to the communicating means for generating the alarm signal and providing the generated alarm signal to the communicating means for transmission thereof.

3. The portable alarm video recording and transmitting device of claim 1, wherein communicating means may use any one or more of the following wireless transmissions: radio transmissions, microwave transmissions, broadband wireless data transmissions and/or satellite transmission.

4. The portable alarm video recording and transmitting device of claim 1, wherein the first component unit is capable of being activated wirelessly by a monitoring station at a remote location.

5. The portable alarm video recording and transmitting device of claim 1, wherein the illuminating means is capable of being activated wirelessly by a monitoring station at a remote location.

6. The portable alarm video recording and transmitting device of claim 1, wherein the activation button of the second component unit is capable of being activated wirelessly by a monitoring station at a remote location.

7. The portable alarm video recording and transmitting device of claim 1, wherein the audiovisual recording means includes a miniature camera system equipped with a microphone.

8. The portable alarm video recording and transmitting device of claim 1, wherein portable alarm video recording and transmitting device is anyone of the following: detachable, semi-permanent or permanently affixed.

9. The portable alarm video recording and transmitting device of claim 1, wherein alarm notification means is in electrical communication with said second component unit's communicating means for receiving an encrypted signal containing an alarm notification generated from the monitoring station, wherein said encrypted signal containing an alarm notification is decrypted by the microprocessor in electrical communication with said second component unit's communicating means and said alarm notification means for alerting the wearer of said second component unit of receipt of said encrypted signal containing an alarm notification of impending danger.

10. The portable alarm video recording and transmitting device of claim 1, wherein alarm notification means is capable of any one of the following: causing a vibration of said portable remote terminal, sounding an audio alarm and flashing a light, visual or text of the decrypted signal containing the game play instruction on the display element.

11. The alarm circuit of claim 1, wherein said alarm circuit for generating a silent alarm signal, further comprising an alarm button positioned on an exterior surface of said second component unit, which is in electrical communication with the alarm circuit, where upon activation of the alarm button an alarm signal is generated by said alarm circuit and said signal includes said encoded location of the wearer, which is transmitted by said second component unit's communication means for receipt at said monitoring station providing notification of the wearer's location and the request for assistance.

12. The portable alarm video recording and transmitting device of claim 1, wherein said alarm circuit comprises a circuit board having a microprocessor positioned thereon and connected to said communicating means, wherein said microprocessor generates said alarm signal and provides said generated alarm signal to said communicating means for transmission thereof.

13. The portable alarm video recording and transmitting device of claim 1, wherein said location determining means and means for encoding said location in said alarm signal is comprised of a global positioning system receiver connected to a microprocessor.

14. The portable alarm video recording and transmitting device of claim 13, wherein said global positioning system receiver provides an output signal representative of the geographical location of the wearer to the microprocessor and the generated alarm signal is encoded with said geographical location.

15. The portable alarm video recording and transmitting device of claim 14, further comprising a monitoring station for receiving said generated alarm signal having the geographical location encoded thereon and the recorded video images and is able to visually monitor the geographical location and recorded video images of the wearer based on the receipt of the generated alarm signal having said geographical location encoded thereon and the recorded video images.

16. The portable alarm video recording and transmitting device of claim 1, wherein said casing is formed from a semi-rigid material for preventing inadvertent activation of said covert alarm button.

17. The portable alarm video recording and transmitting device of claim 1, wherein said illuminating means is capable of wireless activation.

18. The portable alarm video recording and transmitting device of claim 1, wherein said illuminating means light intensity may be adjusted.

19. The illuminating means of claim 1, wherein said illuminating means may be to display any one or more of the following: white, green, blue or red light.

20. The portable alarm video recording and transmitting device of claim 1, wherein said first component unit is powered by a battery.

21. The portable alarm video recording and transmitting device of claim 1, wherein said second component unit is powered by a battery.

22. The portable alarm video recording and transmitting device of claim 1, further includes an earpiece equipped with a radio transceiver in wireless communications with the communicating means of the first component unit.

23. The portable alarm video recording and transmitting device of claim 1, further includes an earpiece equipped with a radio transceiver in wireless communications with the communicating means of the second component unit.

* * * * *